(12) United States Patent
Geiger et al.

(10) Patent No.: US 7,177,338 B2
(45) Date of Patent: Feb. 13, 2007

(54) DIODE-PUMPED SOLID-STATE LASER HAVING A THERMAL LENS INSIDE THE RESONATOR

(75) Inventors: Stephan Geiger, Prittlbach (DE); Martin Paster, Ebersberg (DE); Siegfried Freer, Germering (DE)

(73) Assignee: Tui Laser AG, Germering (DE)

( * ) Notice: Subject to any disclaimer, the term of this patent is extended or adjusted under 35 U.S.C. 154(b) by 0 days.

(21) Appl. No.: 10/527,705

(22) PCT Filed: Sep. 10, 2003

(86) PCT No.: PCT/EP03/10054
§ 371 (c)(1),
(2), (4) Date: Sep. 15, 2005

(87) PCT Pub. No.: WO2004/027944
PCT Pub. Date: Apr. 1, 2004

(65) Prior Publication Data
US 2006/0153266 A1    Jul. 13, 2006

(30) Foreign Application Priority Data
Sep. 11, 2002  (DE) ................. 102 41 988

(51) Int. Cl.
*H01S 3/09*   (2006.01)
*H01S 3/092*  (2006.01)

(52) U.S. Cl. ............................ 372/69; 70/72

(58) Field of Classification Search ............ 372/69–72, 372/92–93, 98–99, 101
See application file for complete search history.

(56) References Cited

U.S. PATENT DOCUMENTS 5,638,397 A   6/1997   Nighan, Jr. et al.

(Continued)

FOREIGN PATENT DOCUMENTS

DE           196 44 315 A1    10/1997

(Continued)

OTHER PUBLICATIONS

Koechner W., "Resonator Configuration", Solid State Laser Engineering, Berlin, Springer, DE 1988, pp. 174-191.

(Continued)

*Primary Examiner*—Minsun Oh Harvey
*Assistant Examiner*—Phillip Nguyen
(74) *Attorney, Agent, or Firm*—Buchanan Ingersoll & Rooney PC

(57) ABSTRACT

Disclosed is a diode-pumped solid-state laser having an asymmetrical optical resonator provided with at least two resonator mirrors, inside said resonator being provided at least one thermal lens having an optical refractive power D and having two principal planes respectively and said resonator being definable by the following stability criteria:

$$0 < G_1 \cdot G_2 < 1$$

with $$G_1 = 1 - L^*/R_1 - D \cdot d_2$$

$$G_2 = 1 - L^*/R_2 - D \cdot d_1$$

and $$L^* = d_1 + d_2 - D \cdot d_1 \cdot d_2$$

$d_1, d_2$ the distances of the resonator mirror from the principal planes of the thermal lens
$R_1, R_2$ the radii of curvature of the resonator mirrors.

The invention is distinguished by the values $d_1, d_2, R_1$ and $R_2$ being selected in such a manner that the following critical refractive powers $D_I, D_{II}, D_{III}$ and $D_{IV}$, for which $$D_I = -\frac{1}{R_1 - d_1} - \frac{1}{R_2 - d_2}, \quad D_{II} = \frac{1}{d_2} - \frac{1}{R_1 - d_1},$$

$$D_{III} = \frac{1}{d_1} - \frac{1}{R_2 - d_2}, \quad D_{IV} = \frac{1}{d_1} + \frac{1}{d_2}$$

applies, the following equations are fulfilled:

$$D_{II} - D_I = D_{IV} - D_{III} \geq 8 \text{ dptr.}$$

$$|D_{III} - D_{II}| \geq 2 \text{ dptr.}$$

10 Claims, 2 Drawing Sheets

U.S. PATENT DOCUMENTS

| | | | |
|---|---|---|---|
| 5,651,020 A | 7/1997 | Nighan, Jr. et al. | |
| 5,912,912 A * | 6/1999 | Caprara et al. | 372/25 |
| 5,930,283 A * | 7/1999 | Imai et al. | 372/94 |
| 6,115,402 A * | 9/2000 | Caprara | 372/101 |
| 6,285,705 B1 * | 9/2001 | Iwashiro et al. | 372/99 |
| 6,393,034 B1 * | 5/2002 | Konno et al. | 372/10 |
| 6,504,858 B2 * | 1/2003 | Cheng et al. | 372/39 |
| 6,813,286 B1 * | 11/2004 | Danziger et al. | 372/19 |
| 6,853,670 B2 * | 2/2005 | Yanagisawa et al. | 372/101 |
| 6,870,862 B2 * | 3/2005 | Momiuchi et al. | 372/22 |
| 6,888,859 B2 * | 5/2005 | Weber et al. | 372/34 |

FOREIGN PATENT DOCUMENTS

| | | |
|---|---|---|
| WO | 96/35246 | 11/1996 |
| WO | 97/07575 | 2/1997 |

OTHER PUBLICATIONS

Walter Koechner, "Solid-State Laser Engineering", Springer-Verlag Berlin Heidelberg, New York London Paris Tokyo, Second Completely Revised and Updated Edition, 1988, pp. 197-199.

* cited by examiner

DIODE-PUMPED SOLID-STATE LASER HAVING A THERMAL LENS INSIDE THE RESONATOR

This disclosure is based upon German Application No. 102 41 988.4, filed Sep. 11, 2002, and International Application No. PCT/EP2003/010054, filed Sep. 10, 2003, the contents of which are incorporated herein by reference.

TECHNICAL FIELD

The present invention relates to a diode-pumped solid-state laser having an asymmetrical optical resonator provided with at least two resonator mirrors and, inside the resonator, at least one thermal lens with an optical refractive power D.

STATE OF THE ART

Diode-pumped solid-state lasers represent high power, compact light sources which have gained considerable significance as pumped-light sources due to the progress made in laser diode development. Meanwhile laser diodes are available with pumped-light power of 10 W and more and, in addition, have emission wavelength spectra in the optical absorption band range of laser crystals suited for solid-state lasers, yielding highly efficient optical excitation of laser crystals.

Diode-pumped solid-state lasers are fundamentally suited for a multiplicity of different technical fields of application. Preferably, they are used in fields in which high power, small laser systems are desired. For example, such monochromatic light sources are employed in material processing, preferably for surface material processing, such as removal of material, modification of material and surface finishing.

In striving to further optimize laser the performance of diode-pumped solid-state lasers, it is important to particularly consider the parameters determining the stability of the laser resonator. These parameters comprise not only the purely geometric parameters of the resonator itself, such as the radii of curvature $R_1$ and $R_2$ of the resonator mirrors and the distance L between them, but also include the optical refractive behavior of the optically pumped laser crystal. However, the latter is not a constant value but rather depends decisively on the temperature, which is primarily due to the heat from the pumped-light intensity inside the laser crystal.

Usually used to define optical refractive power behavior of an optically pumped laser crystal is an optical lens whose refractive power D depends on the temperature and which has, to describe the geometry, at least one principal plane crystal. In conjunction with the geometric resonator values, the stability criteria of such a type resonator having an intracavity thermal lens, usually referred to in this context as "active resonator", using the so-called G factors formulated as follows:

$$G_1 = 1 - L^*/R_1 - D \cdot d_2$$

$$G_2 = 1 - L^*/R_2 - D \cdot d_1$$

and $$L^* = d_1 + d_2 - d \cdot d_1 \cdot d_2$$

In the preceding, $L^*$ is the effective resonator length and $d_1$ and $d_2$ are the distances of the resonator mirrors from the principal planes of the thermal lens. $R_1$ and $R_2$ are the radii of curvature of the resonator mirror. Further details are provided in Solid-state Laser Engineering", 5th ed., pp. 210 ff.

To describe a stable, active resonator the condition: $0 < G_1 G_2 < 1$ applies for $G_1$ and $G_2$. If, for graph representation, the linear factors $G_1$ and $G_2$, which are dependent on the refractive power D, are entered in a stability diagram as shown in FIG. 5.13 on page 213 in Koechner's aforecited book, the G parameters of a given resonator, which is defined by the geometric parameters. $R_1$, $R_2$ and L (actually the distance between the resonator mirrors) lie with a variable refractive power D on a straight line.

FIG. 2 shows such a type stability diagram, along whose abscissa, $G_1$ is plotted and along whose ordinate, $G_2$ is plotted.

Assuming the simplest case of an optical resonator having an intracavity thermal lens whose refractive power does not vary, such a type could be defined by a single point in the stability diagram.

Contrary to this, resonators which are defined by certain geometric parameters and, in particular, whose construction is asymmetric, i.e. the radii of curvature of the resonator mirrors differ from each other, are defined by straight lines, with regard to this see the straight lines AS1 and AS2. However, the stability behavior of these resonators is determined by the temperature-dependent refractive power D, which can assume broken down varying critical refractive powers $D_I, D_{II}, D_{III}$ and $D_{IV}$.

It was proven that an asymmetrical resonator having intracavity thermal lens along a straight AS1, respectively AS2, in two separate regions exhibit stable oscillation behavior. The two stable oscillation regions are formed identically large, respectively identically wide, with respect to the refractive power. The range limits, the so-called critical refractive powers $D_I, D_{II}, D_{III}$ and $D_{IV}$, have proven to be particularly relevant for the stability behavior of such a type asymmetrical resonator. The critical refractive powers characterize the transition points at which the stable oscillation behavior of an asymmetrical resonator becomes unstable when exceeding the critical refractive power or falling short of the critical refractive power. The stable regions are shown in FIG. 2 with corresponding hatching under hyperbolic branches, respectively.

Taking the above into consideration, the diode-pumped solid-state laser described in U.S. Pat. No. 5,638,397 can be characterized by a confocally to concentrically designed resonator arrangement. Thus, the diode-pumped solid-state laser described in the preceding printed publication is distinguished by a largely symmetrical resonator construction, which comprises resonator types including, in addition to the purely symmetrical resonators, asymmetrical resonators that have a particular stability behavior which is very close to that of confocal resonators, i.e. the resonator behavior of such type resonators can be defined by the G values, which lie very close to the point B of the stability diagram.

DESCRIPTION OF THE INVENTION

The object of the present invention is to design a diode-pumped solid-state laser having an asymmetrical optical resonator, which has at least two resonator mirrors and which provides inside the resonator at least one thermal lens having an optical refractive power D, in such a manner that the construction size of the resonator is reduced, in particular the length of the resonator is shortened to obtain an extremely compact resonator construction. At the same time temporally short pulses of less than 100 nanoseconds, preferably less than 10 ns, with very high peak pulse powers should be attainable and this at as high as possible repetition rates of up to 150 kHz.

The purpose is to build as compact as possible lasers, preferably for material processing, with which the material surfaces should be processed, for example in engraving, which requires a critical power density for successful material processing.

The solution of the object on which the present invention is based is set forth in claim 1. Advantageous features forming the inventive idea are the subject matter of the subordinate claims and elucidated in the description with reference to the preferred embodiments.

A key element of the present invention is to design a diode-pumped solid-state laser according to the generic part of claim 1 in such a manner that the values $d_1, d_2, R_1$ and $R_2$ are selected in such a manner that with the following critical refractive powers $D_I$, $D_{II}$, $D_{III}$, and $D_{IV}$, for which $$D_I = -\frac{1}{R_1 - d_1} - \frac{1}{R_2 - d_2}, \quad D_{II} = \frac{1}{d_2} - \frac{1}{R_1 - d_1},$$

$$D_{III} = \frac{1}{d_1} - \frac{1}{R_2 - d_2}, \quad D_{IV} = \frac{1}{d_1} + \frac{1}{d_2}$$

applies, the following equations are fulfilled:

$D_{II} - D_I = D_{IV} - D_{III} \geq 8$ dptr.

$|D_{III} - D_{II}| \geq 2$ dptr.

Contrary to the hitherto conventionally shaped resonator constructions, which are distinguished by symmetrically or largely symmetrically shaped resonators, such as, for example, in the aforecited U.S. Pat. No. 5,638,397, according to the present invention it was recognized that an intentionally asymmetrically shaped resonator construction, preferably as a convex-plane, convex-concave or convex-convex type resonator and using a laser crystal acting as a thermal lens inside the resonator, a highly compact diode-pumped solid-state laser arrangement can be realized capable of generating nanosecond pulses with very high peak pulse powers and with high-repetition rates.

The critical refractive powers $D_I$ and $D_{II}$ limit a first range in which the diode-pumped solid-state laser designed according to the present invention oscillates stably with varying refractive values. This also applies to the refractive power limits $D_{III}$ and $D_{IV}$, which as critical refractive powers limit the second stable range, within which the asymmetrical resonator has stable oscillation properties. An element of the present invention is that it is now required of the thermal lens in the form of a laser crystal that the permitted refractive power ranges within which the resonator operates stably covers a diopter range of at least 8 diopters. Moreover, the object is to select the directly adjacent range limits of the two refractive power ranges $D_{II}$ and $D_{III}$ in such a manner that the distance between them along the refractive power scale corresponds to at least 2 diopter.

It is important to differentiate between two cases, notably the one in which the two permitted refractive power ranges do not overlap and are distanced at least 2 diopters apart, see the straight line AS1 in FIG. 2, and the other one in which the two refractive ranges overlap in such a manner that the critical refractive powers $D_{II}$ and $D_{III}$ and maintain the aforedescribed minimum distance apart of at least 2 diopters, see the straight line AS2 in FIG. 2.

Due to the latter measure, i.e. $|D_{II} - D_{III}| > 2$, the minimum degree of asymmetry of the resonator is last but not least conditionally defined by the thermal lens.

Usually the intracavity laser crystal is continuously pumped in longitudinal direction, i.e. in the direction of its longitudinal extension, with the aid of a diode laser. In order to generate temporally as short as possible light pulses with high peak powers, particularly with high repetition rates of up to 150 kHz, an acousto-optical or electro-optical Q-switch is provided inside the resonator. As an alternative, an extracavity modulator is provided, for example in the form of a high-frequency operating shutter or an acousto-optical modulator, which leads to similar temporally short light pulses.

Especially suited laser crystals which possess strong, thermal optical focussing properties and thus achieve the desired thermal lens effect are Nd-, Yb-, Cr-, Tm-, Ho- and Er-doped host crystals. Fundamentally, suited are the following host crystal doping agents in corresponding concentrations:

Nd:YAG, Nd:YVO$_4$, Nd:YLF, Nd:GVO$_4$, Nd:YPO$_4$, Nd:BEL, Nd:YALO, Nd:LSB, Yb:YAG, Yb:FAB, Cr:LiSAF, Cr:LiCAF, Cr:LiSGAF, Cr:YAG, Tm—Ho:YAG, Tm—Ho:YLF, Er:YAG, Er:YLF or Er:GSGG.

BRIEF DESCRIPTION OF THE DRAWINGS

The present invention is made more apparent in the following, without the intention of limiting the scope or spirit of the overall inventive idea, using preferred embodiments with reference to the accompanying drawings.

WAYS TO CARRY OUT THE INVENTION, COMMERCIAL APPLICABILITY

Figure 1:
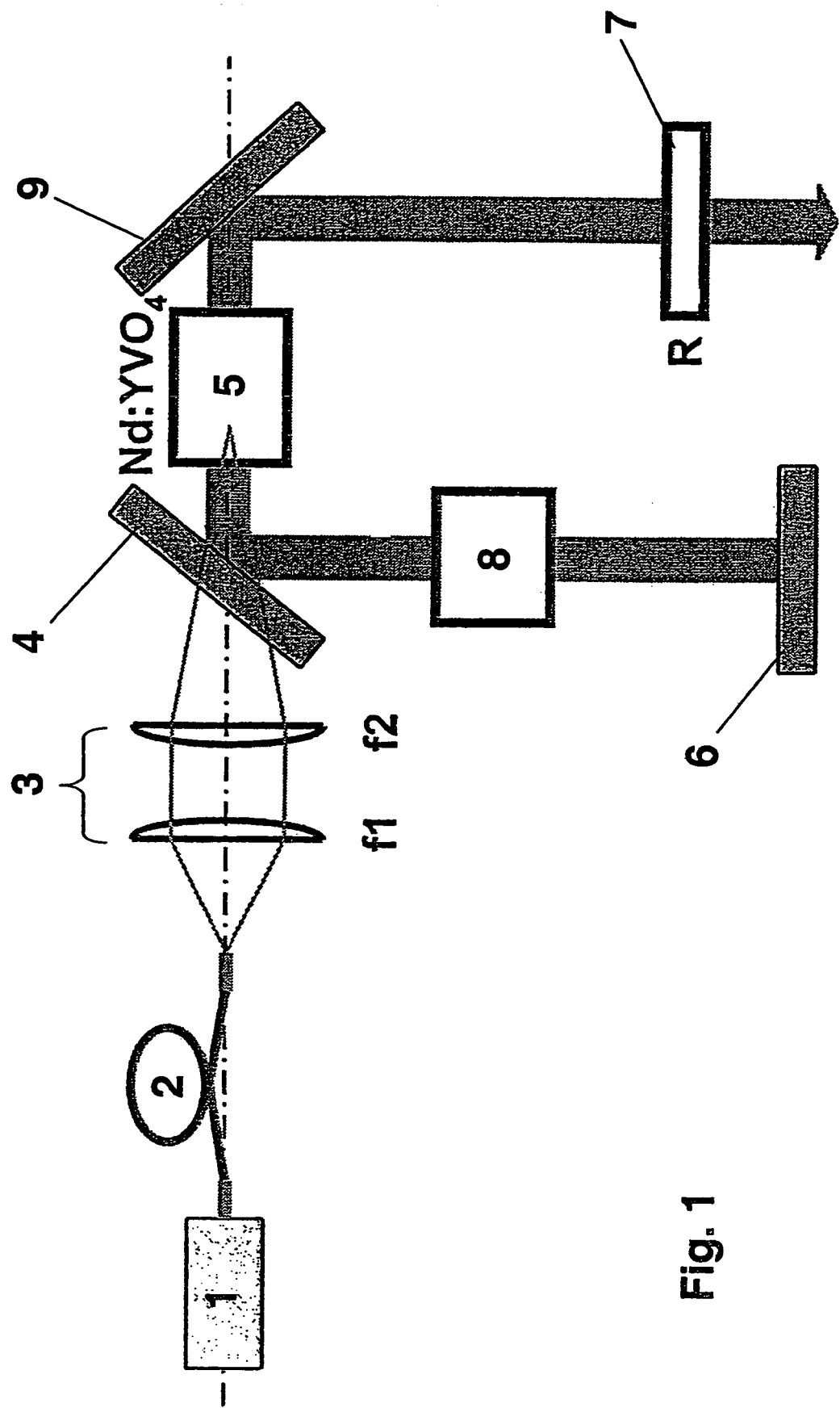
FIG. 1 shows schematically the construction of a diode-pumped solid-state laser.

FIG. 1 shows schematically the construction of a diode-pumped solid-state laser designed according to the present invention. With the aid of a diode module 1, which is able to emit monochromatic light at a wavelength of 808 nanometers, the laser light is coupled longitudinally into the provided intracavity laser crystal 5 via an optical fiber 2 and an imaging optic 3 via a semireflecting mirror 4. The laser crystal 5 comprises a Nd:YVO$_4$ crystal which has especially favorable optical efficiency. The schematically shown resonator is provided with two resonator mirrors 6,7, which have different radii of curvature. Also provided is an intracavity acousto-optical modulator 8 in the form of a Q-switch, which generates the repetition rates of up to 150 kHz with temporal pulse width of at least 3 nanoseconds.

The laser crystal 5 can, of course, also be optically pumped from a second pumped-light source, which could be provided in the preferred embodiment depicted in FIG. 1 to the right of the deflection mirror 9. The laser crystal 5 shows such a manner of thermal refractive behavior that for the critical refractive powers $D_I$, $D_{II}$, $D_{III}$ and $D_{IV}$, for which $$D_I = -\frac{1}{R_1 - d_1} - \frac{1}{R_2 - d_2}, \quad D_{II} = \frac{1}{d_2} - \frac{1}{R_1 - d_1},$$

$$D_{III} = \frac{1}{d_1} - \frac{1}{R_2 - d_2}, \quad D_{IV} = \frac{1}{d_1} + \frac{1}{d_2}$$

applies, the following equations are fulfilled:

$$D_{II}-D_I=D_{IV}-D_{III} \geq 8 \text{dptr.}$$

$$|D_{III}-D_{II}| \geq 2 \text{dptr.}$$

A diode-pumped solid-state laser confectioned in this manner, which can be optically pumped with a diode power of at least 10 W, is able to achieve peak pulse powers PP dependent on the pulse repetition frequency RF according to following table:

| RF[kHz] | PP[kW] |
|---------|--------|
| 10      | >60    |
| 30      | >30    |
| 60      | >10    |
| 90      | >5     |

Moreover pulse widths PW at pulse repetition frequencies RF can be achieved in the following manner:

| RF[kHz] | PW[ns] |
|---------|--------|
| 10      | ~7     |
| 20      | ~10    |
| 30      | ~14    |
| 50      | ~18    |
| 75      | ~22    |
| 100     | ~28    |
| 150     | ~35    |

Figure 2:
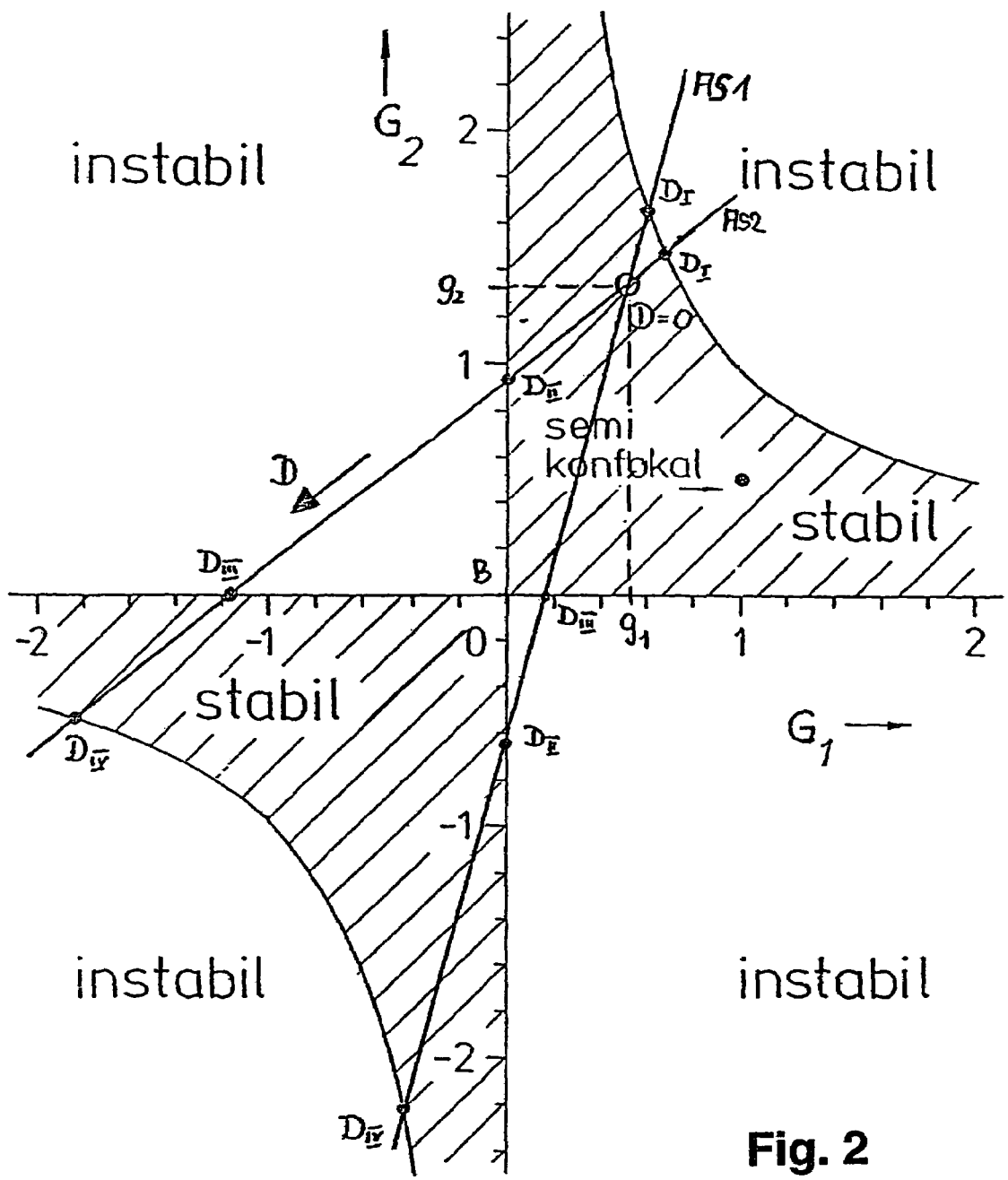
FIG. 2 shows a stabilization diagram.

With respect to the stability diagram shown in FIG. 2 reference is made to the straight lines AS1 and AS2. Straight line AS1 represents the stability behavior of an active resonator whose laser crystal has two distanced apart stability ranges, with $D_{III} > D_{II}$.

However, an active asymmetrical resonator is also able to oscillate stably, for which $D_{II} < D_{III}$ applies, as the straight line AS2 in FIG. 2 shows.

LIST OF REFERENCES 1 diode laser module
2 optical fiber
3 optical imaging system
4 semi-reflecting mirrors
5 laser crystal
6,7 resonator mirror
8 acousto-optical modulator
9 semi-reflecting mirror

The invention claimed is:

1. A diode-pumped solid-state laser having an asymmetrical optical resonator provided with at least two resonator mirrors, inside said resonator being provided at least one thermal lens having an optical refractive power D and having two principal planes respectively and said resonator being definable by the following stability criteria:

$$0 < G_1 \cdot G_2 < 1$$

with $$G_1 = 1 - L^*/R_1 - D \cdot d_2$$

$$G_2 = 1 - L^*/R_2 - D \cdot d_1$$

and $$L^* = d_1 + d_2 - D \cdot d_1 \cdot d_2$$

$d_1, d_2$ the distances of the resonator mirror from the principal planes of the thermal lens $R_1, R_2$ the radii of curvature of the resonator mirrors wherein the values $d_1$, $d_2$, $R_1$ and $R_2$ are selected in such a manner that the following critical refractive powers $D_I, D_{II}, D_{III}$ and $D_{IV}$, for which $$D_I = -\frac{1}{R_1 - d_1} - \frac{1}{R_2 - d_2}, \quad D_{II} = \frac{1}{d_2} - \frac{1}{R_1 - d_1},$$

$$D_{III} = \frac{1}{d_1} - \frac{1}{R_2 - d_2}, \quad D_{IV} = \frac{1}{d_1} + \frac{1}{d_2}$$

applies, the following equations are fulfilled:

$$D_{II}-D_I=D_{IV}-D_{III} \geq 8 \text{dptr.}$$

$$|D_{III}-D_{II}| \geq 2 \text{dptr.}$$

2. The diode-pumped solid-state laser according to claim 1, wherein an intracavity quality-switch or an extracavity modulator is provided.

3. The diode-pumped solid-state laser according to claim 2, wherein said quality-switch is an intracavity acouso-optical or electro-optical Q-switch.

4. The diode-pumped solid-state laser according to claim 1, wherein said asymmetrical optical resonator is provided with a convex-plane, convex-concave or convex-convex resonator construction.

5. The diode-pumped solid-state laser according to claim 1, wherein provided is an intracavity laser medium in the form of at least one laser crystal doped with one or a multiplicity of the following doping substances: Nd, Yb, Cr, Tm, Ho or Er.

6. The diode-pumped solid-state laser according to claim 5, wherein said laser crystal comprises the following doped crystals: Nd:YAG, Nd:YVO$_4$, Nd:YLF, Nd:GVO$_4$, Nd:YPO$_4$, Nd:BEL, Nd:YALO, Nd:LSB, Yb:YAG, Yb:FAB, Cr:LiSAF, Cr:LiCAF, Cr:LiSGAF, Cr:YAG, Tm—Ho:YAG, Tm—Ho:YLF, Er:YLF or Er:GSGG.

7. The diode-pumped solid-state laser according to claim 5, wherein said laser crystal possesses strong thermal optical focussing properties and represents said thermal lens inside said resonator.

8. The diode-pumped solid-state laser according to claim 1, wherein at least one diode laser unit is provided as said pumped-light source, whose pumped light is directed or deflected in longitudinal direction to the optical axis of said thermal lens.

9. The diode-pumped solid-state laser according to claim 1, wherein using a Nd:YVO$_4$ laser crystal and pumped-light power of at least 10 W, the following peak pulse powers PP are attainable based on the pulse repetition frequency RF, at which the solid-state laser is operatable:

| RF[kHz] | PP[kW] |
|---------|--------|
| 10      | >60    |
| 30      | >30    |
| 60      | >10    |
| 90      | >5.    |

10. The diode-pumped solid-state laser according to claim 9, wherein the laser pulses emitted by said solid-state laser have the following pulse widths PW at pulse repetition frequencies RF:

| RF[kHz] | PW[ns] |
|---|---|
| 10 | ~7 |
| 20 | ~10 |
| 30 | ~14 |
| 50 | ~18 |
| 75 | ~22 |
| 100 | ~28 |
| 150 | ~35. |

* * * * *